US012800407B2

(12) United States Patent
Gao et al.

(10) Patent No.: US 12,800,407 B2
(45) Date of Patent: Nov. 17, 2026

(54) ON CHIP PROGRAMMABLE TEMPERATURE REGULATION CIRCUIT

(71) Applicant: NXP USA, Inc., Austin, TX (US)

(72) Inventors: Yuan Gao, Cugnaux (FR); Thierry Dominique Yves Cassagnes, Tournefeuille (FR); Gauthier Thouvenin, Toulouse (FR); Estelle Huynh, Villeneuve-Tolosane (FR)

(73) Assignee: NXP USA, Inc., Austin, TX (US)

( * ) Notice: Subject to any disclaimer, the term of this patent is extended or adjusted under 35 U.S.C. 154(b) by 1072 days.

(21) Appl. No.: 17/937,657

(22) Filed: Oct. 3, 2022

(65) Prior Publication Data

US 2023/0152826 A1 May 18, 2023

(30) Foreign Application Priority Data

Nov. 15, 2021 (EP) .................................... 21306584

(51) Int. Cl.
*G01K 7/01* (2006.01)

(52) U.S. Cl.
CPC ...................................... *G01K 7/01* (2013.01)

(58) Field of Classification Search
CPC .................................. H05B 1/023; G01K 7/01
See application file for complete search history.

(56) References Cited

U.S. PATENT DOCUMENTS 5,911,897 A 6/1999 Hamilton
6,079,121 A * 6/2000 Khadkikar .............. D06F 34/26 34/531
7,429,719 B1 9/2008 Spetz
9,148,910 B1 9/2015 Mimran et al.
9,703,306 B2 * 7/2017 Day ........................ G05F 1/463
10,527,503 B2 * 1/2020 Fritchman .............. G01K 7/203
2005/0218917 A1 10/2005 Huber et al.
2006/0006166 A1 1/2006 Chen et al.
2006/0192805 A1 * 8/2006 Eguchi ................. B41J 2/04563 347/17
2006/0202304 A1 * 9/2006 Orr ....................... H10W 40/10 257/E27.047
2010/0111137 A1 * 5/2010 Chen ........................ G01K 7/01 374/178
2014/0140364 A1 * 5/2014 Charles ................ G01K 15/005 374/178

OTHER PUBLICATIONS

"Demystifying the Operational Transconductance Amplifier" (Year: 2013).*

* cited by examiner

*Primary Examiner* — Woody A Lee, Jr.

(57) ABSTRACT

Programmable temperature regulation circuits, and methods of operating programmable temperature regulation circuits, are disclosed for providing heat to a target area on a chip. The programmable temperature regulation circuits include a heating element on the chip, and a regulation loop operatively connected to the heating element. The regulation loop includes a first diode that measures the temperature in the target area, and an operational transconductance amplifier. The operational transconductance amplifier receives a reference temperature voltage from a reference voltage, and a temperature feedback voltage from the diode, and generates an output voltage to control the provision of electrical power to the heating element.

20 Claims, 5 Drawing Sheets

ON CHIP PROGRAMMABLE TEMPERATURE REGULATION CIRCUIT

CROSS-REFERENCE TO RELATED APPLICATIONS

This application claims the priority under 35 U.S.C. § 119 of European Patent application no. 21306584.0, filed on 15 Nov. 2021, the contents of which are incorporated by reference herein.

FIELD OF THE DISCLOSURE

The present disclosure relates to temperature regulation of semiconductor components within on chip systems, and more particularly to programmable temperature control circuits provided on chip and methods of operating such programmable temperature regulation circuits.

BACKGROUND OF THE DISCLOSURE

Within the field of semiconductor circuits, certain categories of circuitry require a reliable operation over a range of temperatures. For battery management system (BMS) products, for example, accuracy may have to be achievable over a wide temperature range, such as from about −40° C. to about 125° C. In order to guarantee such accuracy, each part is calibrated at multiple different temperatures, for example 90° C., −40° C. and 27° C. in the case of BMS chips. Such temperature insertions are usually performed at Final Test on the packaged parts. Such testing significantly contributes to the cost of manufacturing and is a real concern in terms of competitivity of products.

For at least one or more of these reasons, or one or more other reasons, it would be advantageous if new or improved systems could be developed, and/or improved methods of operation or implementation could be developed, so as to address any one or more of the concerns discussed above or to address one or more other concerns or provide one or more benefits.

BRIEF DESCRIPTION OF THE DRAWINGS

Specific examples have been chosen for purposes of illustration and description, and are shown in the accompanying drawings, forming a part of the specification.

Figure 1:
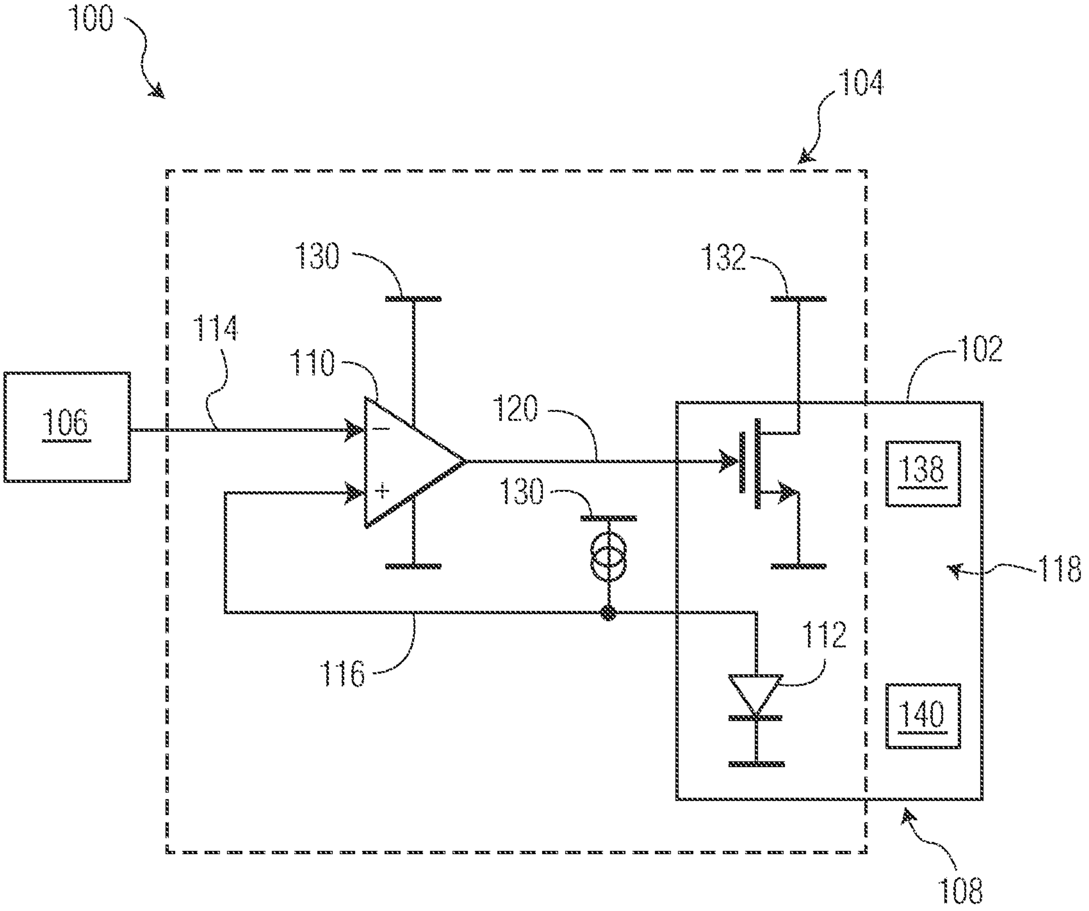
FIG. 1 is a schematic circuit diagram of one embodiment of a programmable temperature regulation circuit of the present technology, at a first point in time.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application is only by way of illustration, and not limitation, the Figures are not necessarily drawn to scale, and the use of the same reference symbols in different drawings indicates similar or identical items unless otherwise noted.

DETAILED DESCRIPTION

Programmable temperature regulation circuits, and methods of operating programmable temperature regulation circuits, are described herein for providing heat to an area on a chip. Programmable temperature regulation circuits may be used with a variety of on chip systems, such as any precision measurement circuits where wide operating temperature range, trim and/or calibration are required, including but not limited to battery management system (BMS) products. Programmable temperature regulation circuits of the present technology can be used for several purposes. For example, they can be used for calibration at test. Additionally, since all components of programmable temperature regulation circuits of the present technology may be included on chip, in circumstances where power consumption profiles allow, heating can be provided during normal operation of the on chip system, which may allow regulation of the operating temperature of temperature sensitive components on the chip. Such heating during normal operation may allow improved accuracy performance over the whole operating temperature range.

Generally, programmable temperature regulation circuits of the present technology include a heating element that provides heat to a target area on a chip in a controlled manner. The target area may be at least a portion of the area of a chip. The heat provided by the heating element can raise the temperature of the target area to a desired temperature. Components of the on chip system that are particularly temperature sensitive and/or critical to accuracy, like a reference voltage for example, may be placed within the target area, so that the effect of temperature on accuracy can be measured and mathematically compensated.

FIGS. 1-5 show examples of one embodiment of a programmable temperature regulation circuit 100 of the present technology. The programmable temperature regulation circuit 100 includes a first heating element 102, a first regulation loop 104 operatively connected to the heating element, and a reference voltage 106.

Figure 2:
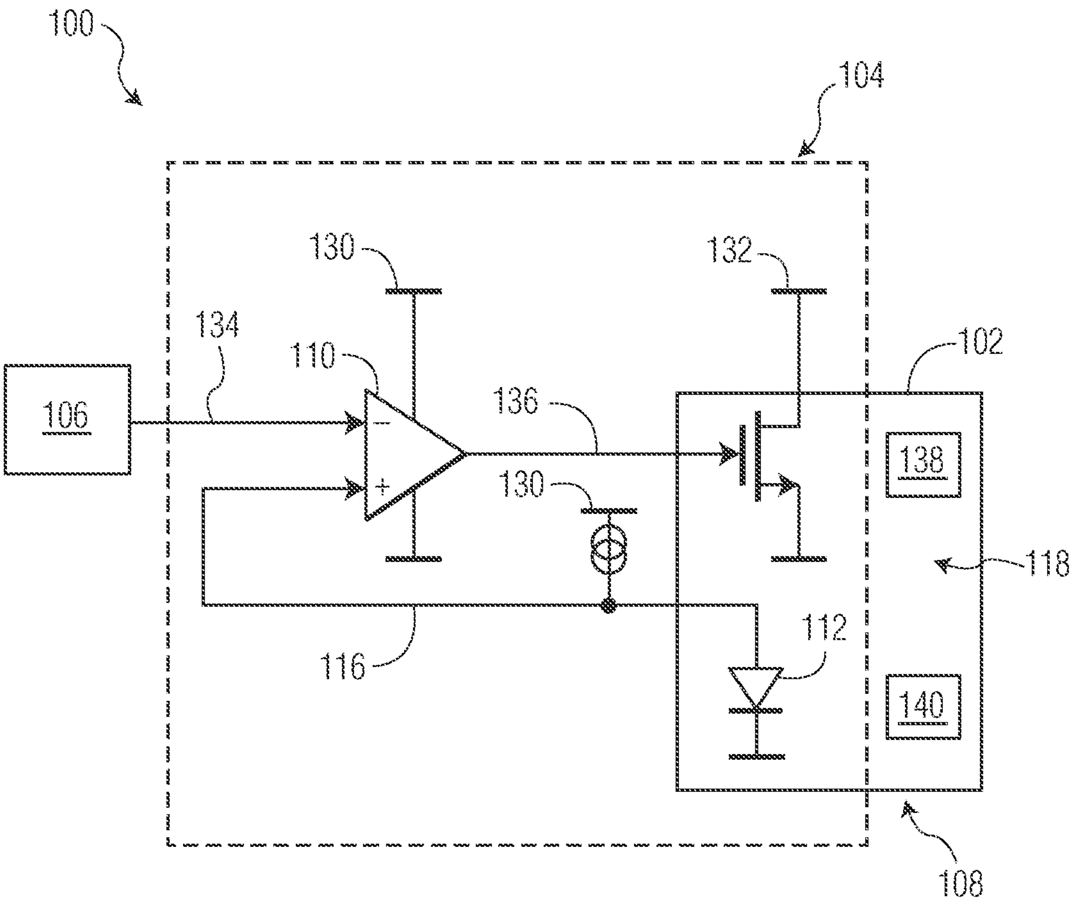
FIG. 2 is a schematic circuit diagram of the programmable temperature regulation circuit of FIG. 1, at a subsequent point in time.
Figure 3:
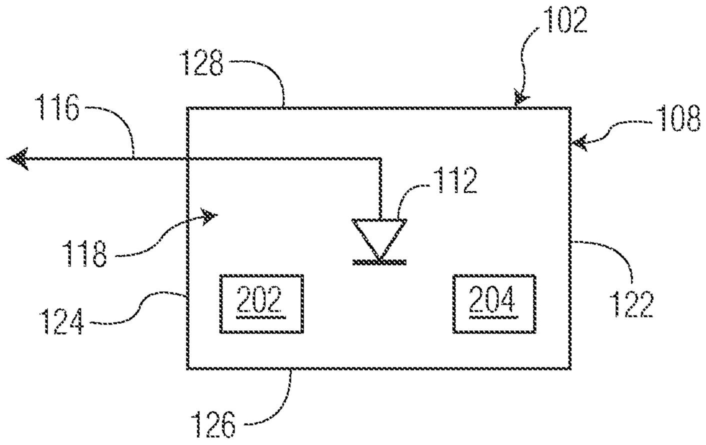
FIG. 3 is a top plan layout view of a heating element of the programmable temperature regulation circuit of FIG. 1.

Referring to FIGS. 1-3, the first heating element 102 converts electrical power to heat. The first heating element 102 can be a transistor, and in at least some examples, can be an n-channel metal-oxide semiconductor (NMOS) transistor. In other examples, the first heating element 102 can be a different type of transistor, such as a P-channel metal-oxide semiconductor (PMOS) transistor, or a bipolar transistor.

The first heating element 102 as shown in the illustrated example defines a closed boundary 108. The target area 118 to be heated by the first heating element 102 in the illustrated example is the area within the closed boundary 108. The closed boundary 108 is shown as being in a rectangular shape, but can be in any suitable shape, including having any number of sides, having rounded or straight edges, and being regular or irregular. However, the heating gradient within closed boundary 108 may be more evenly distributed, and may be more accurately controlled, when the closed boundary 108 is symmetrical in shape.

Additionally, the first heating element 102 is not limited to being a shape that defines a closed boundary. The first heating element 102 may be in any suitable shape, including without limitation, a line segment, a curve, a zig zag, or a partially closed boundary having an opening.

As best shown in FIG. 1, the first regulation loop 104 is operatively connected to the first heating element 102. The first regulation loop 104 provides a first amount of electrical power to the first heating element 102. The first regulation loop 104 includes at least a first operational transconductance amplifier 110, and at least a first diode 112. The first operational transconductance amplifier 110 can be an amplifier configured such that its differential input voltage produces an output current. Thus, it can be a voltage controlled current source (VCCS). The first operational transconductance amplifier 110 is configured to receive a reference temperature voltage 114 and a first temperature feedback voltage 116. The first diode 112 provides the first temperature feedback voltage 116 to the first operational transconductance amplifier 110. The reference voltage 106 provides the reference temperature voltage 114 to the first operational transconductance amplifier 110.

Accordingly, at a first point in time during operation, the first operational transconductance amplifier 110 receives the first temperature feedback voltage 116 from the first diode 112 and the reference temperature voltage 114 from the reference voltage 106, and generates a first output voltage 120 based at least in part on the first temperature feedback voltage 116 and the reference temperature voltage 114. The first output voltage 120 generated by the first operational transconductance amplifier 110 controls the provision of the first amount of electrical power provided to the first heating element 102. The first heating element 102 converts the first amount of electrical power to heat, and provides heat to the target area, such as the area 118 within the closed boundary 108 defined by the first heating element 102.

Referring to FIG. 2, as time passes during operation of the programmable temperature regulation circuit 100, the temperature within the target area is expected to change over time, in response to receiving heat generated by the first heating element 102, and potentially other factors. Additionally, the reference temperature may change, such as if an operator of the system alters the reference temperature. For example, at least one temperature sensor, or a plurality of temperature sensors, can be placed within the target area 118, such as temperature sensor 138 and temperature sensor 140 shown in FIGS. 1 and 2. The temperature sensors 138 and 140 can provide temperature measurements to the operator of the system, and thus allow the operator to monitor the temperature within the target area 118. Particularly in examples where the target area 118 is relatively large, it may be desirable to place a plurality of temperature sensing elements in different locations inside the heater ring, so that the temperature gradient can be monitored across the whole target area. Depending upon the results of the temperature measurements, the operator may adjust the reference temperature, and thus the reference temperature voltage 114.

Thus, the first operational transconductance amplifier 110 can generate at least one subsequent output voltage to adjust, maintain, or otherwise control the amount of heat being generated by the first heating element 102. Preferably, the first operational transconductance amplifier 110 can periodically generate subsequent output voltages to adjust, maintain, or otherwise control the amount of heat being generated by the first heating element 102. Accordingly, at a second point in time, after the first operational transconductance amplifier 110 generates a first output voltage 120, the first diode can generate at least one subsequent temperature feedback voltage 132, and the reference voltage 106 can generate a subsequent reference temperature voltage 134. The first operational transconductance amplifier 110 can receive a subsequent temperature feedback voltage 132 from the first diode 112 and a subsequent reference temperature voltage 134 from the reference voltage 106, and can generate a subsequent output voltage 136 based at least in part on the subsequent temperature feedback voltage 132 and the subsequent reference temperature voltage 134. The subsequent output voltage 136 generated by the first operational transconductance amplifier 110 controls a subsequent amount of electrical power provided to the first heating element 102. The first heating element 102 converts the subsequent amount of electrical power to heat, and provides heat to the target area, such as the area 118 within the closed boundary 108 defined by the first heating element 102. The subsequent reference temperature voltage 134 can be the same as, or different from, such as being lower than or greater than, the first reference temperature voltage 114. The at least one subsequent temperature feedback voltage 132 can be the same as, or different from, such as being lower than or greater than, the first temperature feedback voltage 120. The at least one subsequent output voltage, and any subsequent output voltage, can be the same as, or different from, such as being lower than or greater than, the first output voltage 120.

Referring to FIGS. 1-3, the first diode 112 can be located within the target area to be heated by the heating element 102. The first diode 112 functions as a temperature sensor, and the first temperature feedback voltage 116 sent by the first diode 112 provides information regarding the temperature within the target area to the first operational transconductance amplifier 110. In examples where the heating element 102 defines a closed boundary, the first diode 112 can be located within the closed boundary 104. Referring to FIG. 3, in at least some such examples, the first diode 112 can be located centrally within the closed boundary 104, such as being equidistant, or substantially equidistant, from at least two opposing sides of the closed boundary 104. For example, the first diode 112 can be equidistant, or substantially equidistant, from a first set of opposing sides of the closed boundary 108 defined by the heating element 102, such as first side 122 and second side 124. As further shown in FIG. 3, the first diode 112 can also be equidistant, or substantially equidistant, from a second set 126 and 128 of opposing sides of the closed boundary 108 defined by the heating element 102, such as third side 126 and fourth side 128.

Figure 4:
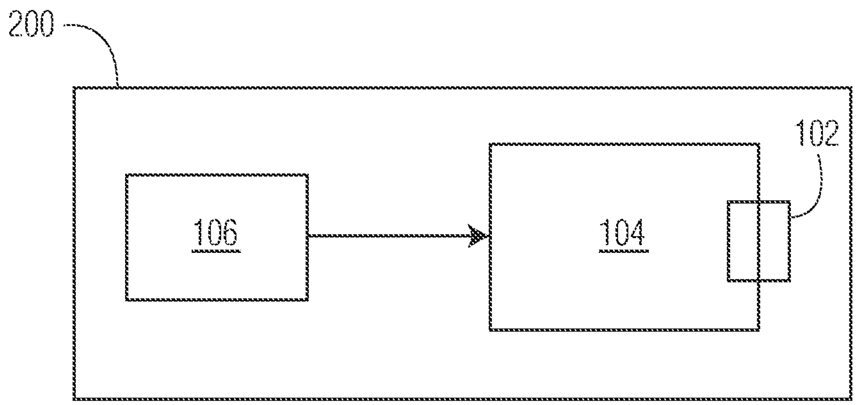
FIG. 4 is a top plan layout view of one example of the programmable temperature regulation circuit of FIG. 1, having the reference voltage on chip.
Figure 5:
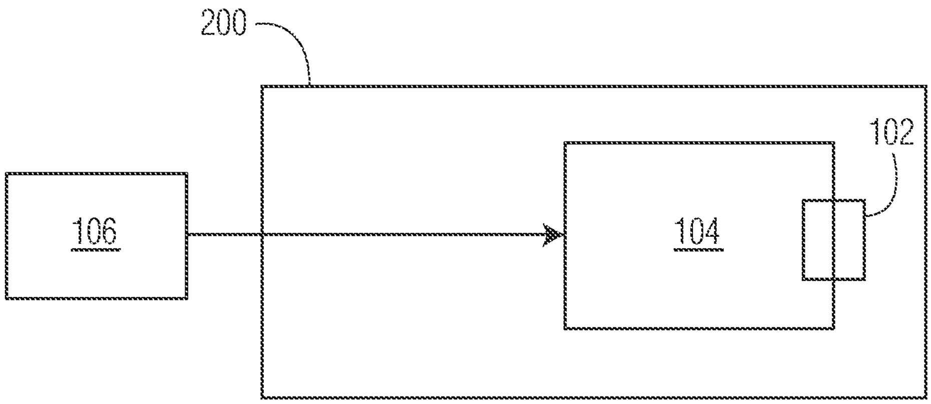
FIG. 5 is a top plan layout view of another example of programmable temperature regulation circuit of FIG. 1, having the reference voltage external to the chip.

Referring to FIGS. 4 and 5, the first heating element 102 and the components of the first regulation loop 104, including the first operational transconductance amplifier 110 and the first diode 112 as shown in FIG. 1, can all be located on the chip 200. It should be understood that systems on a chip (SoCs), such as chip 200, can include any number of other devices on the chip 200 that are part of the SoC. Referring to FIG. 3, in addition to the first diode 112, any SoC devices that are desired to be influenced by the first heating element 102, such as reference voltage 202 and temperature sensor 204, can be placed inside the target area 118.

FIGS. 4 and 5 illustrate alternative examples for the location of the reference voltage 106. FIG. 4 shows an example in which the reference voltage 106 is located on the chip 200. In such examples, the reference voltage 106 can be provided in any suitable manner, such as being part of an on-chip, temperature insensitive, digital to analog converter (DAC) system. In addition, when the reference voltage 106 is located on the chip 200, the temperature control loop 104 can be enabled during normal operation of the SoC in cases where temperature regulation is desired, which may reduce the operation temperature range. FIG. 5 shows an example in which the reference voltage 106 is provided external to the chip 200, and is thus not located on the chip 200. In such examples, the reference voltage 106 can be supplied in any suitable manner, including by external equipment, such as lab equipment or a production test system.

Referring back to FIGS. 1 and 2, the components of the programmable temperature regulation circuit 100 can be powered by a plurality of power sources. In at least some examples, a first power supply 130 having a first voltage supplies power to the components of the first regulation loop 104, including the first diode 112 and the first operational transconductance amplifier 110. The first power supply 130 can be a low voltage power supply, such as having a voltage that is less than or equal to about 5 volts, or between about 2 volts and about 5 volts. A second power supply 132 having a second voltage can be used to supply power to the first heating element 102. The first voltage of the first power supply 130 can be lower than the second voltage of the second power supply 132. In at least some examples, the second power supply 132 may have a voltage of up to about 90 volts, or up to about 100 volts, or potentially higher than 90 volts, including higher than 100 volts. In at least one example, the second power supply 132 can be an external power supply, not provided on the chip. Use of a higher voltage power supply for the second power supply 132 may provide increased energy efficiency, and may allow a flexible choice of power heating device and heating voltage without changing the power supply or needs of the components of the first regulation loop 104.

Figure 6:
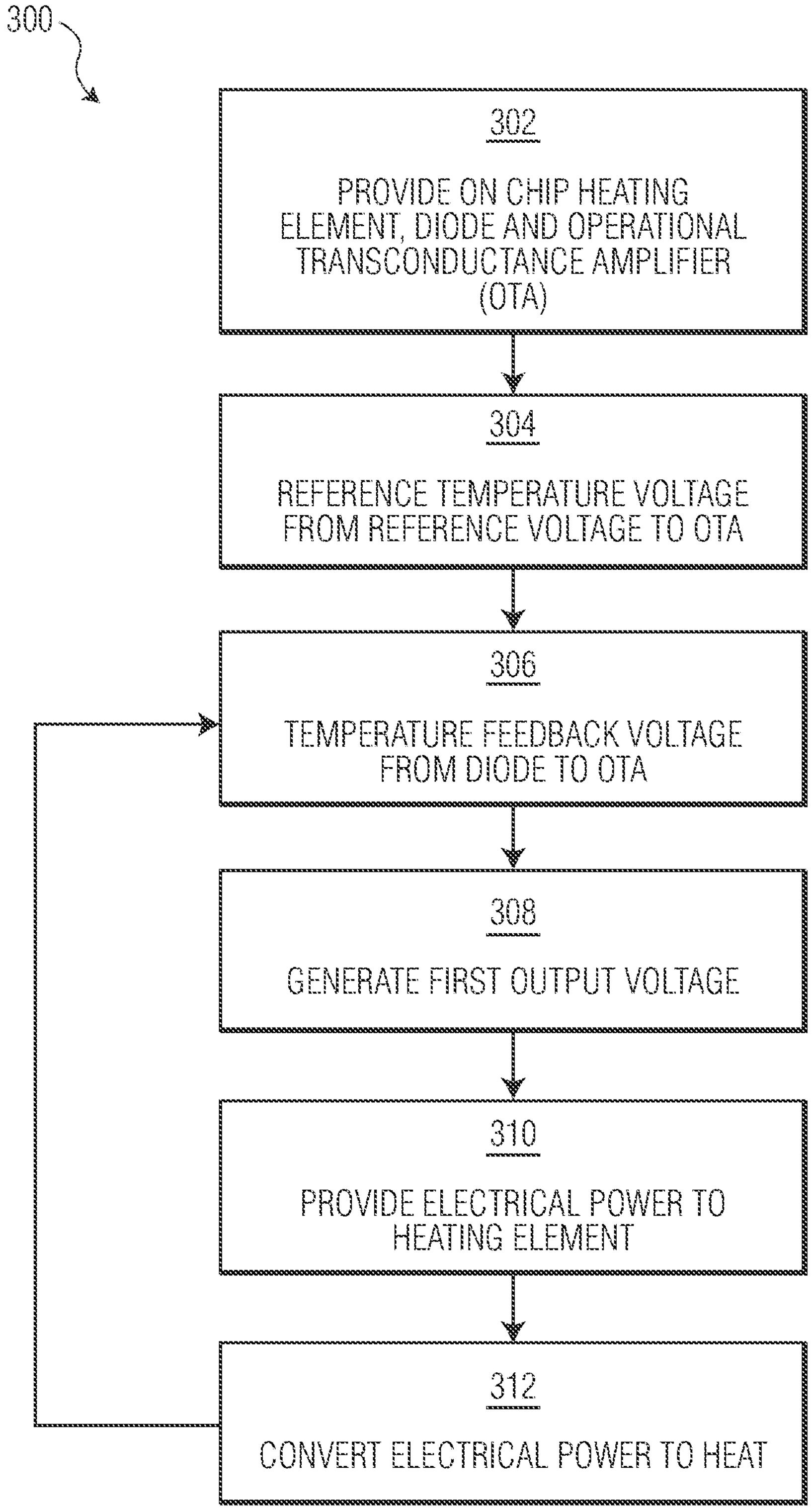
FIG. 6 is a flow chart illustrating one method of operating a programmable temperature regulation circuit of FIG. 1.

FIG. 6 is a flow chart showing one method 300 of operating a programmable temperature regulation circuit of the present technology, such as programmable temperature regulation circuit 100 as shown in FIGS. 1-5, or programmable temperature regulation circuit 400, shown in FIG. 6 (discussed further below).

The method 300 starts at step 302, which includes providing a fist regulation loop operatively connected to a first heating element, such as heating element, on a chip. The first regulation loop includes a first diode and a first operational transconductance amplifier. The first diode, such as first diode 112 in FIG. 1, has a negative temperature coefficient, meaning that as the temperature inside the target area increases, the voltage across first diode will decrease.

Referring back to FIG. 6, the method proceeds to step 304, which includes providing a reference temperature voltage from a reference voltage to the first operational transconductance amplifier. As shown in FIGS. 4 and 5, the reference voltage 106 can be provided on the chip or external to the chip, depending upon the application.

Referring back to FIG. 6, the method can proceed to step 306, which includes providing a first temperature feedback voltage from the first diode to the first operational transconductance amplifier. The first temperature feedback voltage, such as first temperature feedback voltage 116 in FIG. 1, relates to the temperature measured by the first diode 112 at a first point in time, which may be an initial temperature in the target area. Additionally, while step 306 is provided in FIG. 6 after step 304, they can occur in any order, simultaneously, or substantially simultaneously. Referring to FIG. 1, the first reference temperature voltage 114 and first temperature feedback voltage 116 are provided as inputs to control the first operational transconductance amplifier 110. Generally, if a higher temperature in the target area 118 is desired, the first reference temperature voltage 114 should be lower than the first temperature feedback voltage 116.

Referring back to FIG. 6, the method can proceed to step 308, which includes generating by the first operational transconductance amplifier (OTA) a first output voltage based at least in part on the first temperature feedback voltage and the reference temperature. Referring to FIG. 1, the first operational transconductance amplifier 110 generates a first output voltage 120 based at least in part on the first temperature feedback voltage 116 and the reference temperature voltage 114. If the first temperature feedback voltage 116 is higher than the reference temperature voltage 114, the first operational transconductance amplifier 110 will generate a first output voltage 120.

Referring back to FIG. 6, the method can proceed to step 310, which includes providing a first amount of electrical power from the regulation loop to the first heating element. For example, the first output voltage 120 from the first operational transconductance amplifier 110 can cause a first amount of electrical power to be provided to the heating element 102 from the power supply for the heating element 102, such as the second power supply 132.

Referring back to FIG. 6, the method can proceed to step 312, which includes converting the first amount of electrical power to heat using the first heating element on the chip. In other words, referring to FIG. 1, the heating element can receive a first amount of power from the second power supply 132, and convert that power to heat that is used to heat the target area 118.

The method 300 can include repeating steps 306-312 at least a second time, or periodically or continuously, in order to adjust, maintain, or otherwise control the amount of heat being generated by the first heating element 102. For example, referring to FIGS. 1 and 2, when the heating element 102 provides heat to the target area 118 in response to the first output voltage 120 generated by the first operational transconductance amplifier 110, the voltage across the first diode 112 will decrease, and the subsequent temperature feedback voltage 132 provided by the fist diode 112 will be decreased. Even assuming the subsequent reference temperature voltage 134 from the reference voltage 106 does not change, and is equal to the first reference temperature voltage 114, the subsequent output voltage 136 would differ from the first output voltage 120 due to the change in the temperature feedback voltage from the first diode 112. If the subsequent temperature feedback voltage 132 from the first diode 112 equals the subsequent reference temperature voltage 134, the subsequent output voltage 136 from the first operational transconductance amplifier 110 can be an amount that is just sufficient to maintain the temperature feedback voltage from the first diode 112 at the same level as the reference temperature voltage. This may provide temperature stability for at least the first diode 112 and the SoC devices within the target area 118.

Figure 7:
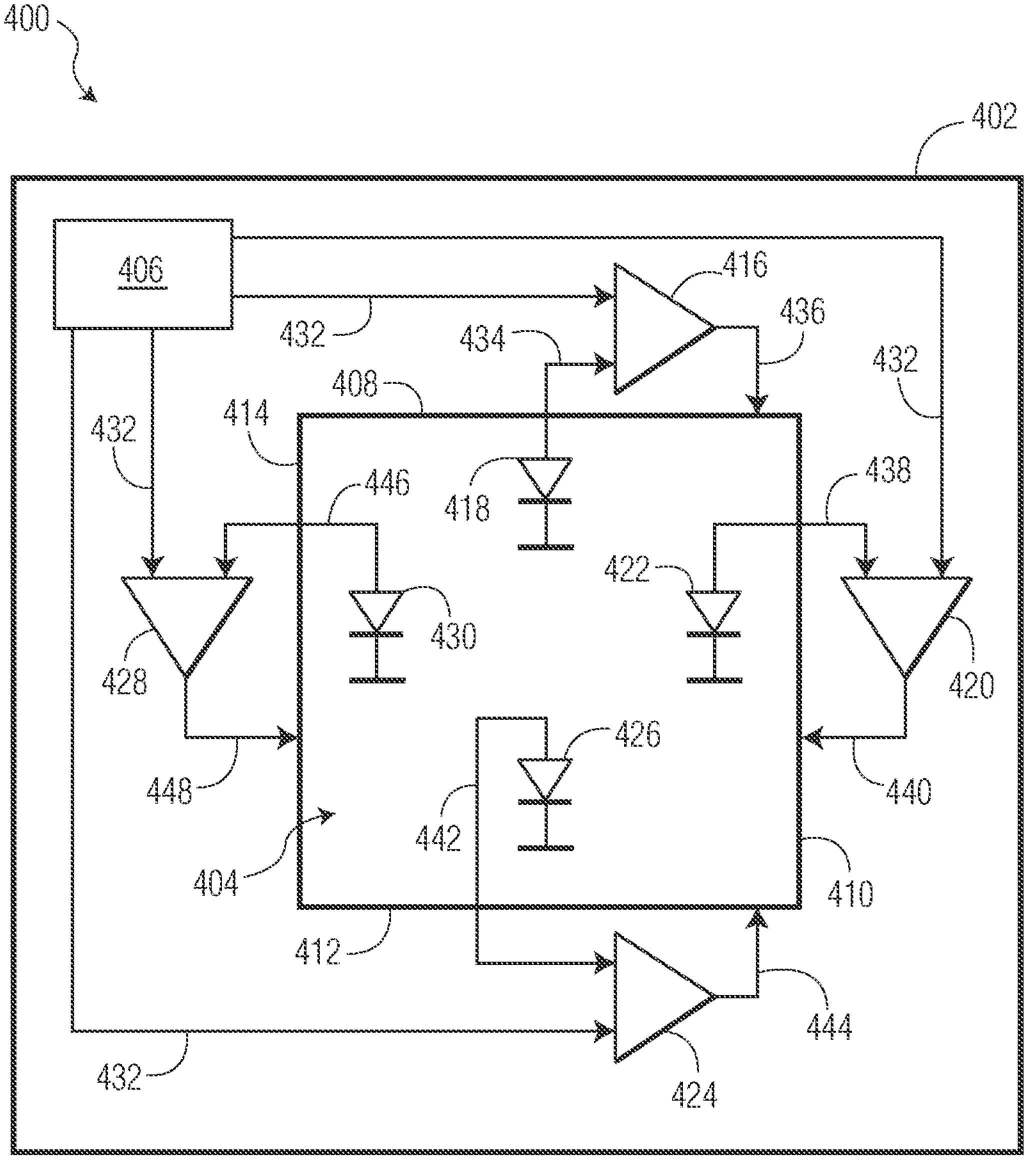
FIG. 7 is a schematic circuit diagram of a second embodiment of a programmable temperature regulation circuit of the present technology.

The present disclosure is intended to encompass numerous additional embodiments including those disclosed herein as well as a variety of alternate embodiments. For example, as shown in FIG. 7, a programmable temperature regulation circuit 400 of the present technology can include a plurality of heating elements and an associated plurality of regulation loops provided on a single chip 402. The heating elements and regulation loops can be operated in conjunction with one another, such as being operated simultaneously, to provide heating of one or more target areas, such as target area 404, on the chip 402. Accordingly, in addition to the first heating element, first operational transconductance amplifier, and first diode, a programmable temperature regulation circuit of the present technology can include at least a second heating element on the chip that converts a second amount of electrical power to heat, a second operational transconductance amplifier, and a second diode that provides a second temperature feedback voltage to the second operational transconductance amplifier. It should be understood that, while four heating elements, and their associated regulation loops, are shown in FIG. 7, any suitable number could be used depending upon the configuration of the particular SoC system with which the programmable temperature regulation circuit is being used.

As shown in FIG. 7, the programmable temperature regulation circuit 400 includes a first heating element 408, a second heating element 410, a third heating element 412, and a fourth heating element 414. The programmable temperature regulation circuit 400 includes a first regulation loop, which includes first operational transconductance amplifier 416 and a first diode 418, which is operatively connected to the first heating element 408. The programmable temperature regulation circuit 400 can also include a second regulation loop, which includes second operational transconductance amplifier 420 and a second diode 422, which is operatively connected to the second heating element 410. The programmable temperature regulation circuit 400 can further include a third regulation loop, which includes third operational transconductance amplifier 424 and a third diode 426, which is operatively connected to the third heating element 412. The programmable temperature regulation circuit 400 can further include a third regulation loop, which includes fourth operational transconductance amplifier 428 and a fourth diode 430, which is operatively connected to the fourth heating element 414.

The programmable temperature regulation circuit 400 further includes at least one reference voltage 406, which can provide a reference temperature voltage 432 to each of the operational transconductance amplifiers, including first operational transconductance amplifier 416, second operational transconductance amplifier 420, third operational transconductance amplifier 424, and fourth operational transconductance amplifier 428. As with reference voltage 106 of the programmable temperature regulation circuit 100, reference voltage 406 can be provided on the chip 402 or external to the chip 402.

During operation, each operational transconductance amplifier receives a temperature feedback voltage from the diode operatively connected thereto, and the reference temperature voltage from the reference voltage, and generates an output voltage based at least in part on the first temperature feedback voltage and the reference temperature voltage. The first output voltage generated by each operational transconductance amplifier controls an amount of electrical power provided to the heating element operatively connected thereto. Each heating element converts the received amount of electrical power to heat, and provides the heat to the target area.

Accordingly, in the example illustrated in FIG. 7, the first operational transconductance amplifier 416 receives the first temperature feedback voltage 434 from the first diode 418 and the reference temperature voltage 432 from the reference voltage 406, and generates a first output voltage 436 based at least in part on the first temperature feedback voltage 434 and the reference temperature voltage 432. The first output voltage 436 generated by the first operational transconductance amplifier 416 controls a first amount of electrical power provided to the first heating element 408. The first heating element 408 converts the first amount of electrical power to heat, and provides that heat to the target area 404. Additionally, the second operational transconductance amplifier 420 receives the second temperature feedback voltage 438 from the second diode 422 and the reference temperature voltage 432 from the reference voltage 406, and generates a second output voltage 440 based at least in part on the second temperature feedback voltage 438 and the reference temperature voltage 432. The second output voltage 440 generated by the second operational transconductance amplifier 420 controls a second amount of electrical power provided to the second heating element 410. The second heating element 410 converts the second amount of electrical power to heat, and provides that heat to the target area 404. Further, the third operational transconductance amplifier 424 receives the third temperature feedback voltage 442 from the third diode 426 and the reference temperature voltage 432 from the reference voltage 406, and generates a third output voltage 444 based at least in part on the third temperature feedback voltage 442 and the reference temperature voltage 432. The third output voltage 444 generated by the third operational transconductance amplifier 424 controls a third amount of electrical power provided to the third heating element 412. The third heating element 412 converts the third amount of electrical power to heat, and provides that heat to the target area 404. Finally, the fourth operational transconductance amplifier 428 receives the fourth temperature feedback voltage 446 from the fourth diode 430 and the reference temperature voltage 432 from the reference voltage 406, and generates a fourth output voltage 448 based at least in part on the fourth temperature feedback voltage 446 and the reference temperature voltage 432. The fourth output voltage 448 generated by the fourth operational transconductance amplifier 428 controls a fourth amount of electrical power provided to the fourth heating element 414. The fourth heating element 414 converts the fourth amount of electrical power to heat, and provides that heat to the target area 404.

In accordance with the foregoing, in at least some embodiments encompassed herein, the present disclosure relates to programmable temperature regulation circuits, and methods of operating programmable temperature regulation circuits, for providing heat to a target area on a chip.

In one aspect, an example of a programmable temperature regulation circuit for providing heat to a target area on a chip is provided that can include a first heating element on the chip that converts a first amount of electrical power to heat. The programmable temperature regulation circuit can also include a first regulation loop operatively connected to the heating element, wherein the first regulation loop controls provision of the first amount of electrical power to the first heating element, the first regulation loop including a first operational transconductance amplifier that receives, at a first point in time, a first reference temperature voltage and a first temperature feedback voltage, and a first diode that provides the first temperature feedback voltage to the first operational transconductance amplifier. The programmable temperature regulation circuit can also include a reference voltage that provides the first reference temperature voltage to the first operational transconductance amplifier.

The first operational transconductance amplifier of the programmable temperature regulation circuit can generate a first output voltage based at least in part on the first temperature feedback voltage and the first reference temperature, and the first output voltage controls the provision of the first amount of electrical power to the first heating element.

The first heating element of the programmable temperature regulation circuit can be a transistor.

The first heating element of the programmable temperature regulation circuit can be selected from the group consisting of an n-channel metal-oxide semiconductor (NMOS) transistor, a P-channel metal-oxide semiconductor (PMOS) transistor, and a bipolar transistor.

The first heating element of the programmable temperature regulation circuit can define a closed boundary. In at least one example, the closed boundary is symmetrical in shape. Additionally, the first diode of the programmable temperature regulation circuit can be located on the chip within the closed boundary. For example, the first diode can be equidistant from a first side and a second side of a set of opposing sides of the closed boundary.

In an example, the first operational transconductance amplifier of the programmable temperature regulation circuit can generate a first output voltage based at least in part on the first temperature feedback voltage and the first reference temperature, and the first output voltage can control the provision of the first amount of electrical power to the first heating element.

The programmable temperature regulation circuit can include a first power supply having a first voltage that supplies power to the first diode and the first operational transconductance amplifier, and a second power supply having a second voltage that supplies power to the first heating element. In at least some examples, the first voltage is lower than the second voltage. For example, the first voltage can be less than or equal to 5 volts. In contrast, the second voltage can be up to about 100 volts.

The reference voltage of the programmable temperature regulation circuit can be located on the chip. Alternatively, the reference voltage of the programmable temperature regulation circuit can be external to the chip.

At a second point in time, the first operational transconductance amplifier of the programmable temperature regulation circuit can receive a subsequent reference temperature voltage from the reference voltage and a subsequent temperature feedback voltage from the first diode. The first operational transconductance amplifier can generate a subsequent output voltage based at least in part on the subsequent temperature feedback voltage and the subsequent reference temperature.

The programmable temperature regulation circuit can further comprise a second heating element on the chip that converts a second amount of electrical power to heat; a second operational transconductance amplifier; and a second diode that provides a second temperature feedback voltage to the second operational transconductance amplifier. The second operational transconductance amplifier can receive the second temperature feedback voltage from the second diode and the reference temperature from the reference voltage, and can generate a second output voltage based at least in part on the second temperature feedback voltage and the reference temperature. The second output voltage can control the second amount of electrical power provided to the second heating element.

In another aspect, an example of a method of operating a programmable temperature regulation circuit to heat a target area is provided. The method can include providing a first regulation loop operatively connected to a first heating element on a chip, the first regulation loop including a first diode and a first operational transconductance amplifier. The method can also include providing a first temperature feedback voltage from the first diode to the first operational transconductance amplifier, and providing a reference temperature voltage from a reference voltage to the first operational transconductance amplifier. The method can further include providing a first amount of electrical power to the first heating element.

In an example, the method can include generating by the first operational transconductance amplifier a first output voltage based at least in part on the first temperature feedback voltage and the reference temperature. In an example, the method can also include converting the first amount of electrical power to heat using the first heating element on the chip.

One or more of the embodiments encompassed herein can be advantageous in any of a variety of respects. For example, programmable temperature regulation circuits as described herein may provide lower testing costs. Additionally, programmable temperature regulation circuits as described herein may allow regulation of the operating temperature of temperature sensitive components on the chip, which may provide improved accuracy in performance over the whole operating temperature range. Further, use of an external power source as the power supply for the heating element(s) can allow increased efficiency by reducing the heating current and time duration for the same temperature change.

While the principles of the invention have been described above in connection with specific apparatus, it is to be clearly understood that this description is made only by way of example and not as a limitation on the scope of the invention. It is specifically intended that the present invention not be limited to the embodiments, examples, and illustrations contained herein, but include modified forms of those embodiments and examples including portions of the embodiments and examples, and combinations of elements of different embodiments and examples as come within the scope of the following claims.

What is claimed is:

1. A programmable temperature regulation circuit for providing heat to a target area on a chip, the programmable temperature regulation circuit comprising:

at least one heating element including a first heating element on the chip that converts a first amount of electrical power to heat;

at least one regulation loop including a first regulation loop operatively connected to the heating element, wherein the first regulation loop controls provision of the first amount of electrical power to the first heating element, the first regulation loop including a first operational transconductance amplifier including a first input that receives, at a first point in time, a first reference temperature voltage and including a second input to receive a first temperature feedback voltage, and a first diode that provides the first temperature feedback voltage to the second input of the first operational transconductance amplifier, the first operational transconductance amplifier including an output coupled to a heating element input of the heating element to provide the first amount of electrical power;

a reference voltage terminal that provides the first reference temperature voltage to the first input of the first operational transconductance amplifier;

a first power supply having a first voltage that supplies power to the at least one regulation loop including the first diode and the first operational transconductance amplifier; and a second power supply having a second voltage that supplies power to the at least one heating element including the first heating element.

2. The programmable temperature regulation circuit of claim 1, wherein the first heating element is selected from the group consisting of an n-channel metal-oxide semiconductor (NMOS) transistor, a P-channel metal-oxide semiconductor (PMOS) transistor, and a bipolar transistor.

3. The programmable temperature regulation circuit of claim 1, wherein the first heating element defines a closed boundary.

4. The programmable temperature regulation circuit of claim 3, wherein the closed boundary is symmetrical in shape.

5. The programmable temperature regulation circuit of claim 3, wherein the first diode is located on the chip within the closed boundary.

6. The programmable temperature regulation circuit of claim 3, wherein the first diode is equidistant from a first side and a second side of a set of opposing sides of the closed boundary.

7. The programmable temperature regulation circuit of claim 1, wherein the first operational transconductance amplifier generates a first output voltage based at least in part on the first temperature feedback voltage and the first reference temperature voltage, and the first output voltage controls the provision of the first amount of electrical power to the first heating element.

8. The programmable temperature regulation circuit of claim 1, wherein the first voltage is lower than the second voltage.

9. The programmable temperature regulation circuit of claim 1, wherein the first voltage is less than or equal to 5 volts.

10. The programmable temperature regulation circuit of claim 1, wherein, at a second point in time, the first operational transconductance amplifier receives a subsequent reference temperature voltage from the reference voltage and a subsequent temperature feedback voltage from the first diode.

11. The programmable temperature regulation circuit of claim 10, wherein the first operational transconductance amplifier generates a subsequent output voltage based at least in part on the subsequent temperature feedback voltage and the subsequent reference temperature.

12. The programmable temperature regulation circuit of claim 1, further comprising:

the at least one heating element includes a second heating element on the chip that converts a second amount of electrical power to heat;

the at least one regulation loop includes a second regulation loop including:

a second operational transconductance amplifier; and a second diode that provides a second temperature feedback voltage to the second operational transconductance amplifier.

13. The programmable temperature regulation circuit of claim 12, further comprising:

a first power supply having a first voltage that supplies power to the first diode, the first operational transconductance amplifier, the second diode, and the second operational transconductance amplifier; and a second power supply having a second voltage that supplies power to the first heating element and the second heating element.

14. The programmable temperature regulation circuit of claim 12, wherein the second operational transconductance amplifier receives the second temperature feedback voltage from the second diode and a second reference temperature voltage from the reference voltage, and generates a second output voltage based at least in part on the second temperature feedback voltage and the reference temperature, wherein the second output voltage controls the second amount of electrical power provided to the second heating element.

15. The programmable temperature regulation circuit of claim 1, wherein the reference voltage is external to the chip.

16. The programmable temperature regulation circuit of claim 1, wherein the second voltage is up to about 100 volts.

17. A method of operating a programmable temperature regulation circuit to heat a target area, the method comprising:

providing at least one regulation loop including a first regulation loop operatively connected to a heating element input of at least one heating element including a first heating element on a chip, the first regulation loop including a first diode and a first operational transconductance amplifier;

providing a first power supply voltage to the first operational transconductance amplifier;

providing a second power supply voltage to the at least one heating element, the second power supply voltage being greater than the first power supply voltage;

providing a first temperature feedback voltage from the first diode to a first input of the first operational transconductance amplifier;

providing a reference temperature voltage from a reference voltage terminal to a second input of the first operational transconductance amplifier; and providing, by an output of the first operational transconductance amplifier, a first amount of electrical power to the heating element input of the first heating element.

18. The method of claim 17, further comprising:

generating by the first operational transconductance amplifier a first output voltage based at least in part on the first temperature feedback voltage and the reference temperature.

19. The method of claim 17, further comprising:

converting the first amount of electrical power to heat using the first heating element on the chip.

20. The method of claim 17, wherein:

the first power supply voltage is less than or equal to five volts; and the second power supply voltage is greater than or equal to ninety volts.

* * * * *